(Model.)
C. SLOTTERBEK.
EYEGLASSES OR SPECTACLES.
No. 311,615. Patented Feb. 3, 1885.
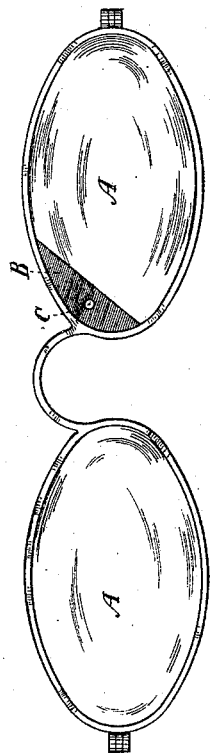

UNITED STATES PATENT OFFICE.

CHARLES SLOTTERBEK, OF LAKEPORT, CALIFORNIA.

EYEGLASSES OR SPECTACLES.

SPECIFICATION forming part of Letters Patent No. 311,615, dated February 3, 1885.

Application filed August 16, 1884. (Model.)

*To all whom it may concern:*

Be it known that I, CHARLES SLOTTERBEK, of Lakeport, in the county of Lake and State of California, have invented an Improvement in Eyeglasses or Spectacles; and I hereby declare the following to be a full, clear, and exact description thereof.

My invention relates to certain improvements in eyeglasses or spectacles; and it consists of a perforated opaque diaphragm which is substituted for a small section of either lens of an ordinary spectacle or eyeglass.

Referring to the accompanying drawing for a more complete explanation of my invention, the figure shows a pair of eye or spectacle glasses with my invention applied.

This invention is especially useful as an aid to persons whose eye-sight has become defective, and acts as a collimator in enabling them to take sight either in shooting a gun or in the use of surveying-instruments or for other similar purposes.

A A are the glasses of a pair of spectacles or ordinary eyeglasses, which may be united or fixed by any of the usual methods. At one angle, preferably the interior and upper side of one of the glasses, I cut away a portion and insert an opaque diaphragm, B; or the glass itself may be made opaque for a portion at this point, as shown. Through this opaque diaphragm a small hole, C, is made, which is not covered with glass or any other substance. By making this opaque portion at one side of the glass, the glasses may be used for all ordinary purposes without any interference; but when the wearer wishes to use the rifle it will be found that when the rifle is brought to the shoulder and the head in the proper position to look through the sights, the hole C through the opaque diaphragm B will be in the proper line of collimation with the sights without in any wise straining the eye or placing the head in an unnatural position. The advantage of this device is that it cuts off all the diffused light and permits only a direct ray to enter, thus enabling the operator to draw an accurate line of collimation through the sights of an ordinary rifle, even although he may suffer from the defective convexity of the eye. It corrects the parallax and diffraction occasioned by the ordinary open sight or globes in common use, and aids in securing an accurate aim. As before stated, it leaves the view unimpeded when its use is not necessary, so that a person using glasses will use them in the ordinary manner without any interference by the opaque portion. The position of the collimator in the orbit of the spectacle-glass is such that the foramen is in collimation with the axis of vision when the head of the operator is brought into the position required for taking aim through the sights of a gun or rifle.

Having thus described my invention, what I claim as new, and desire to secure by Letters Patent, is—

An improvement in spectacles or eye glasses, consisting of the perforated opaque diaphragm fixed at one side of the lens, substantially as herein described.

In witness whereof I have hereunto set my hand.

CHARLES SLOTTERBEK.

Witnesses:
GEO. H. STRONG,
S. H. NOURSE.